United States Patent [19]
Arakawa et al.

[11] Patent Number: 5,727,731
[45] Date of Patent: Mar. 17, 1998

[54] HEATER UNIT OF AUTOMOTIVE AIR CONDITIONING DEVICE

[75] Inventors: Hidenobu Arakawa; Yoshiaki Inaba; Masaharu Onda, all of Tochigi, Japan

[73] Assignee: Calsonic Corporation, Tokyo, Japan

[21] Appl. No.: 808,505

[22] Filed: Feb. 27, 1997

[30] Foreign Application Priority Data

Feb. 28, 1996 [JP] Japan ................... 8-041035

[51] Int. Cl.⁶ ........................................ B60H 1/12
[52] U.S. Cl. .................. 237/12.3 B; 165/43; 454/161
[58] Field of Search ................... 62/244; 16/42, 16/43; 237/12.3 B, 12.3 A; 454/160, 161

[56] References Cited

U.S. PATENT DOCUMENTS

| | | | |
|---|---|---|---|
| 4,227,569 | 10/1980 | Wattin | 165/42 |
| 4,513,808 | 4/1985 | Ito et al. | 165/42 |
| 4,515,208 | 5/1985 | Sakurai et al. | 165/43 |
| 4,898,325 | 2/1990 | Sakurada | 165/42 |
| 5,042,566 | 8/1991 | Hildebrand | 165/43 |
| 5,176,201 | 1/1993 | Yamamoto | 165/42 |
| 5,338,249 | 8/1994 | Hildebrand et al. | 454/160 |

FOREIGN PATENT DOCUMENTS 56-8712  1/1981  Japan .

*Primary Examiner*—William E. Tapolcal
*Attorney, Agent, or Firm*—Foley & Lardner

[57] ABSTRACT

A heater unit of automotive air conditioning device comprises a case. In the case, there are defined a cool air passage, a hot air passage and an air mix chamber. The cool air passage has an upstream end merged with an air inlet opening of the case and a downstream end merged with the air mix chamber. The hot air passage has an upstream end merged with the upstream end of the cool air passage and a downstream largest area merged with the air mix chamber. The air mix chamber is directly communicated with air outlet openings of the case. A heater core is arranged in the upstream end of the hot air passage. An air mix door is pivotally arranged in the case to vary the flow rate between air directed toward the hot air passage and air directed toward the cool air passage. A shutter door is pivotally arranged in the downstream largest area of the hot air passage. A link mechanism is used for achieving synchronized pivoting movements of the air mix door and the shutter door. The link mechanism has at least first and second conditions. In the first condition, the air mix door assumes a full cool position and the shutter door fully closes the hot air passage, while in the second condition, the air mix door assumes a half-open position other than the full cool and full hot positions and the shutter door fully opens the hot air passage.

16 Claims, 3 Drawing Sheets

HEATER UNIT OF AUTOMOTIVE AIR CONDITIONING DEVICE

BACKGROUND OF THE INVENTION

1. Field of the Invention

The present invention relates in general to an automotive air conditioning devices and more particularly to heater units of the air conditioning devices. More specifically, the present invention is concerned with the heater units of a type which can effectively prevent mixing of hot air with cool air directed to a ventilation air blow opening, under full cool mode of the air conditioning device.

2. Description of the Prior Art

In order to clarify the task of the present invention, two conventional heater units 10A and 10B of an automotive air conditioning device will be described with reference to FIGS. 4 and 5 of the accompanying drawings.

In the conventional heater unit 10A of FIG. 4, a heater core 11 is arranged in a case 30 in a manner to define a hot air passage 13 and a cool air passage 14. Under operation of an associated automotive engine, engine cooling water is constantly fed to the heater core 11 through water pipes 22. At a downstream portion of these two passages 13 and 14, there is defined an air mixing chamber 12. At a downstream end of the mixing chamber 12, there are formed first, second and third openings 16, 17 and 18 which are defined by the case 30. The openings 16, 17 and 18 are equipped with pivotal doors 16a, 17a and 18a respectively.

A first air duct (not shown) extends from the first opening 16 to ventilation openings defined by a dash board of the vehicle cabin, which face toward front seat passengers. A second air duct (not shown) extends from the second opening 17 to hoot position openings defined by the dash board, which face toward foot portions of the front seat passengers. A third air duct (not shown) extends from the third opening to defroster openings defined by the dash board, which face toward an inner surface of a windshield.

With an aid of engine cooling water flowing therein, the heater core 11 warms air passing therethrough. The hot air "H" from the heater core 11 flows into the mixing chamber 12 through the hot air passage 13, while, cool air bypassing the heater core 11 flows into the mixing chamber 12 through the cool air passage 14. As shown, the heater core 11 is inclined with respect to the flowing direction "F" of air which is directed toward an air inlet opening 30a of the case 30. Although not shown in the drawing, a cooler unit is arranged upstream of the heater unit 10A, from which cooled air is delivered toward the air inlet opening 30a. As shown, the hot air passage 13 has a generally U-shaped structure.

Near a front face 11a of the heater core 11, there is pivotally installed an air mix door 15 by which the flow rate between the amount of air directed toward the hot air passage 13 through the heater core 11 and the amount of air directed toward the cool air passage 14 bypassing the heater core 11 is controlled. That is, by varying the angular position of the air mix door 15, the temperature of air blown into a passenger room can be adjusted. When the air mix door 15 assumes a full cool position "FC" as shown in the drawing, the front face 11a of the heater core 11 is blocked by the air mix door 15. Under this condition, cooled air from the cooler unit is forced to flow through the cool air passage 14, the air mix chamber 12 and the first opening 16 and led into a passenger room (not shown) through the ventilation openings of the dash board. The open degree of the first opening 16 is controlled by the pivotal door 16a. While, when the air mix door 15 is pivoted to a full hot position "FH", the cool air passage 14 is fully closed and the front face 11a of the heater core 11 is fully opened. Under this condition, the cooled air from the cooler unit is forced to pass through the heater core 11 to be warmed, and led into the air mix chamber 12 through the hot air passage 13. When, under this condition, the second opening 17 is opened, the warmed air is led into a passenger room through the hoot position openings of the dash board. The open degree of the second opening 17 is controlled by the pivotal door 17a. When the air mix door 15 assumes a position other than the above-mentioned two terminal positions "FC" and "FH", the cooled air from the cooler unit is distributed to the hot air passage 13 and the cool air passage 14 by a distribution ratio determined by the angular position assumed by the air mix door 15. Under this condition, the warmed air from the hot air passage 13 and the cooled air from the cool air passage 14 are mixed in the air mix chamber 12 before being led into the passenger room.

Denoted by numeral 19 is a temperature compensating lib which projects partially into the cool air passage 14 from the case 30 near a downstream end of the hot air passage 13. The temperature compensating lib 19 functions to establish a so-called linear relationship between the temperature of air led into the passenger room and the pivoting movement of the air mix door 15.

Various operation modes are possessed by the air conditioning device. In a full cool mode aimed for cooling the passenger room in a short time, the doors 15, 16a, 17a and 18a of the heater unit 10A assume the illustrated positions. That is, in this mode, the air mix door 15 fully opens the cool air passage 14 assuming the full cool position and the door 16a fully opens the first opening 16. Thus, the cooled air from the cooler unit is instantly led into the passenger room through the cool air passage 13, the mixing chamber 12, the first opening 16, the corresponding air duct and the ventilation openings of the dash board.

However, due to inherent construction, the above-mentioned heater unit 10A has the following drawback.

That is, even under the above-mentioned full cool mode, air "H" staying in the blocked hot air passage 13 is inevitably warmed by the heater core 11 and drawn into the air mix chamber 12 due to an induction effect produced by the flow of the cooled air "C" in the cool air passage. Of course, this phenomenon affects badly the full cool mode.

In order to solve the above-mentioned drawback, the heater unit 10B of FIG. 5 has been proposed, which is disclosed in Japanese Patent First provisional Publication 56-8, 712. That is, in this unit 10B, a shutter door 20 is provided in a middle part of the hot air passage 13 for fully stopping the flow of warmed air toward the air mix chamber 12 in the full cool mode.

However, the heater unit 10B of FIG. 5 has the following new drawback due to provision of the shutter door 20.

That is, the shutter door 20 has a bad effect on the linearly variable relationship between the temperature of air led into the passenger room and the pivoting movement of the air mix door 15. For minimizing such bad effect, it is needed to enlarge the space where the shutter door 20 is arranged. However, this measure causes a bulky construction of the heater unit 10B. Furthermore, even in the heater unit 10B, it is quite difficult to completely suppress the mixing of warmed air "H" with the cooled air "C" in the air mix chamber 12 since a part of the heater core 11 is exposed to a downstream part of the hot air passage 13.

As shown in FIG. 5, feeding of hot water to the heater core 11 may be stopped by a shut valve 21 mounted on the water feeding pipe 22 of the heater core 11. That is, under the full cool mode, the shut valve 21 closes the pipe 22 to disable the heater core 11. However, employment of the shut valve 21 and any controller needed for controlling the shut valve 21 induces increase in production cost of the air conditioning device. Furthermore, even when the shut valve 21 stops the warmed water feeding, remaining warmed water in the heater core 11 would warm the air staying in the hot air passage 13 for a certain time from the feeding stop. This makes the full cool mode poor.

SUMMARY OF THE INVENTION

It is therefore an object of the present invention to provide a heater unit of automotive air conditioning device, which is free of the above-mentioned drawbacks.

According to the present invention, there is provided a heater unit of automotive air conditioning device, which, upon full cool mode of the air conditioning device, can effectively prevent mixing of hot air with cooled air directed to ventilation openings of a passenger room, thereby cooling the passenger room in a shorten time.

According to the present invention, there is provided a heater unit of automotive air conditioning device, which has an appropriate property in controlling the temperature of air fed to the passenger room.

According to the present invention, there is provided a heater unit of automotive air conditioning device, which comprises a case having an air inlet opening and a plurality of air outlet openings; means for defining in the case a cool air passage, a hot air passage and an air mix chamber, the cool air passage having an upstream end merged with the air inlet opening and a downstream end merged with the air mix chamber, the hot air passage having an upstream end merged with the upstream end of the cool air passage and a downstream largest area merged with the air mix chamber, the air mix chamber being directly communicated with the air outlet openings; a heater core arranged in the upstream end of the hot air passage, the heater core being inclined with respect to a flowing direction of air which is directed toward the air inlet opening from the outside of the case; an air mix door pivotally arranged in the case to vary the flow rate between the amount of air directed toward the hot air passage and the amount of air directed toward the cool air passage, the air mix door having a full cool position wherein the air mix door fully closes a front face of the heater core while fully opening the cool air passage and a full hot position wherein the air mix door fully opens the front face of the heater core while fully closing the cool air passage; a shutter door pivotally arranged in the downstream largest area of the hot air passage, the shutter door being capable of fully closing the hot air passage and fully opening the same; and a link mechanism for achieving synchronized pivoting movements of the air mix door and the shutter door, the link mechanism inducing at least first and second conditions, the first condition being a condition wherein the air mix door assumes the full cool position and the shutter door fully closes the hot air passage, the second condition being a condition wherein the air mix door assumes a given position other than the full cool and full hot positions and the shutter door fully opens the hot air passage.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1A:
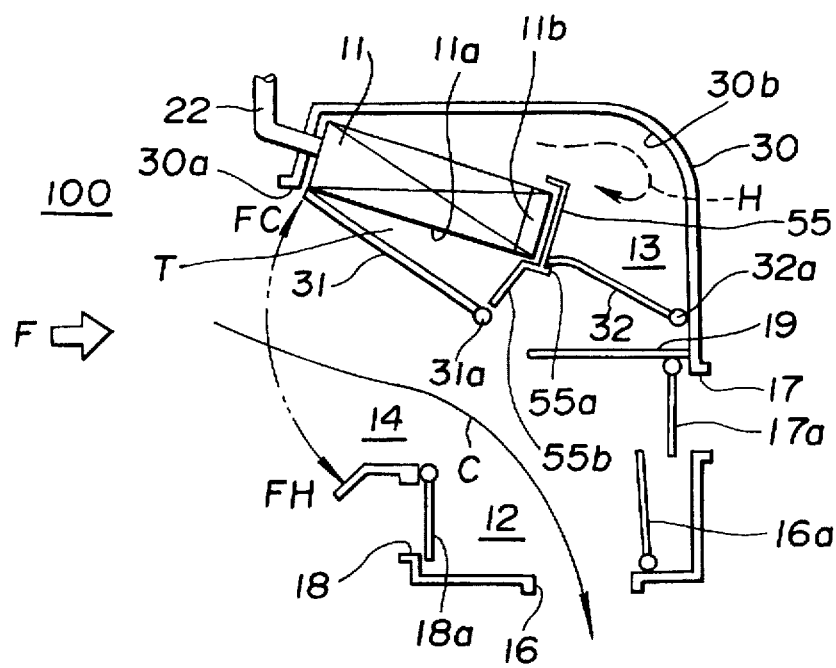
FIG. 1A is a sectional view of a heater unit of the present invention, showing a full cool mode of a corresponding air conditioning device.
Figure 1B:
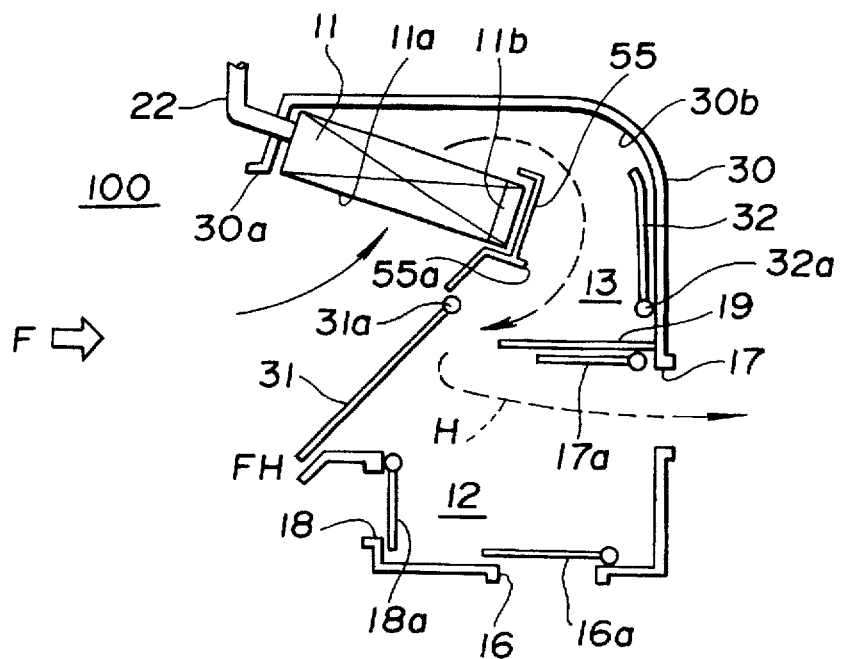
FIG. 1B is a view similar to FIG. 1A, but showing a full hot mode of the air conditioning device.

Referring to FIGS. 1A and 1B, particularly FIG. 1A, there is shown a heater unit 100 of an automotive air conditioning device, which is an embodiment of the present invention.

Although not shown in the drawings, conventional air intake and cooler units are arranged in the left side of the drawing, so that air taken by the air intake unit and flowing in the cooler unit is directed toward the heater unit 100 as is indicated by the arrow "F". The air intake unit is constructed to selectively intake outside air and inside air. The air from the air intake unit is passed through an evaporator installed in the cooler unit and thus cooled and dehumidified, and then the air is led into the heater unit 100.

The heater unit 100 comprises a case 30 in which a heater core 11 is arranged in a manner to define a hot air passage 13 and a cool air passage 14. A water inlet pipe 22 and a water outlet pipe (not shown) are connected to the heater core 11. These pipes 22 extend to a water jacket of an associated internal combustion engine through a known water pump. Thus, under operation of the engine, engine cooling water, which is warmed, is constantly fed to the heater core 11. The heater core 11 has a water tank 11b at a lower portion thereof.

At a downstream portion of the two passages 13 and 14, there is defined an air mix chamber 12. At a downstream end of the air mix chamber 12, there are formed first, second and third openings 16, 17 and 18 which are defined by the case 30. The openings 16, 17 and 18 are equipped with pivotal doors 16a, 17a and 18a respectively. These doors 16a, 17a and 18a control the open degree of the associated openings 16, 17 and 18 in accordance with operation modes assumed by the air conditioning device.

A first air duct (not shown) extends from the first opening 16 to ventilation openings defined by a dash board of a vehicle cabin, which face toward front seat passengers. A second air duct (not shown) extends from the second opening 17 to hoot position openings defined by the dash board, which face toward foot portions of the front seat passengers. A third air duct (not shown) extends from the third opening 18 to defroster openings defined by the dash board, which face toward an inner surface of a windshield.

With an aid of engine cooling water flowing therein, the heater core 11 warms air passing therethrough. The hot air "H" from the heater core 11 flows into the air mix chamber 12 through the hot air passage 13, while, cool air bypassing the heater core 11 flows into the air mix chamber 12 through the cool air passage 14.

As shown, the heater core 11 is inclined by a certain angle with respect to the flowing direction "F" of air which is directed toward an air inlet opening 30a of the case 30. The hot air passage 13 has a generally U-shaped structure.

For shielding and holding the heater core 11, a wall 55 is integrally provided in the case 30, which has a recess for receiving the water tank 11b of the heater core 11. For the purpose which will become apparent hereinafter, the wall 55 is formed with both a ridge portion 55a which slightly projects into the hot air passage 13 and a flange portion 55b which projects into the cool air passage 14.

Near a front face 11a of the heater core 11, there is pivotally arranged an air mix door 31 whose pivot shaft 31a is positioned near a top of the flange portion 55b. By varying the angular position of the air mix door 31, the flow rate between the amount of air directed toward the hot air passage 13 through the heater core 11 and the amount of air directed toward the cool air passage 14 bypassing the heater core 11 is varied. Thus, by varying the angular position of the air mix door 31, the temperature of air fed to a passenger room can be adjusted. When the air mix door 31 assumes a full cool position "FC" as shown in FIG. 1A, the front face 11a of the heater core 11 is blocked by the air mix door 31. Under this condition, cooled air from the cooler unit is forced to flow through the cool pair passage 14, the air mix chamber 12 and the first opening 16 and led into the passenger room through the ventilation openings of the dash board. While, when the air mix door 31 is pivoted to a full hot position "FH" as shown in FIG. 1B, the cool air passage 14 is fully closed and the front face 11a of the heater core 11 is fully opened. Under this condition, the cooled air from the cooler unit is forced to pass through the heater core 11 to be warmed, and led into the air mix chamber 12 through the hot air passage 13. When, under this condition, the second opening 17 is opened as shown, the warmed air is led into the passenger room through the hoot position openings of the dash board. When the air mix door 31 assumes a position other than the above-mentioned two terminal positions "FC" and "FH", the cooled air from the cooler unit is distributed to the hot air passage 13 and the cool air passage 14 by a distribution ratio determined by the angular position assumed by the air mix door 31. Under this condition, the warmed air from the hot air passage 13 and the cooled air from the cool air passage 14 are mixed in the air mix chamber 12 before being led into the passenger room.

Figure 4:
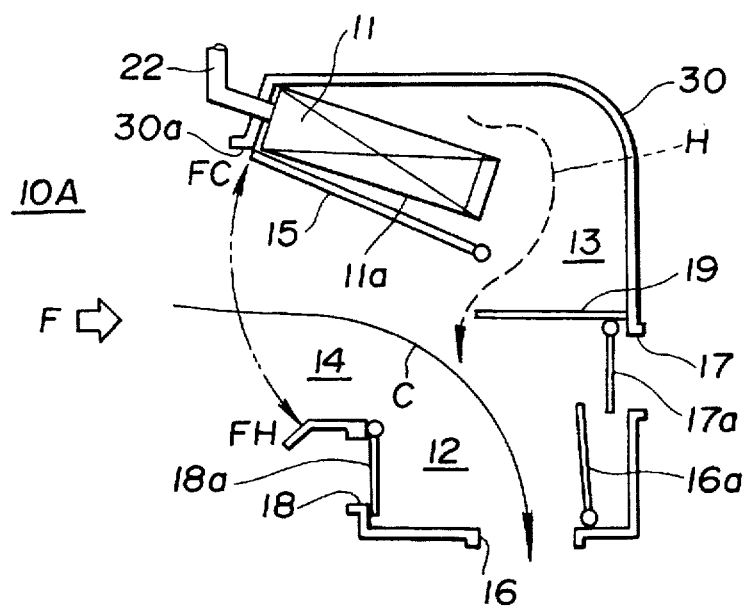
FIG. 4 is a sectional view of a conventional heater unit of automotive air conditioning device.
Figure 5:
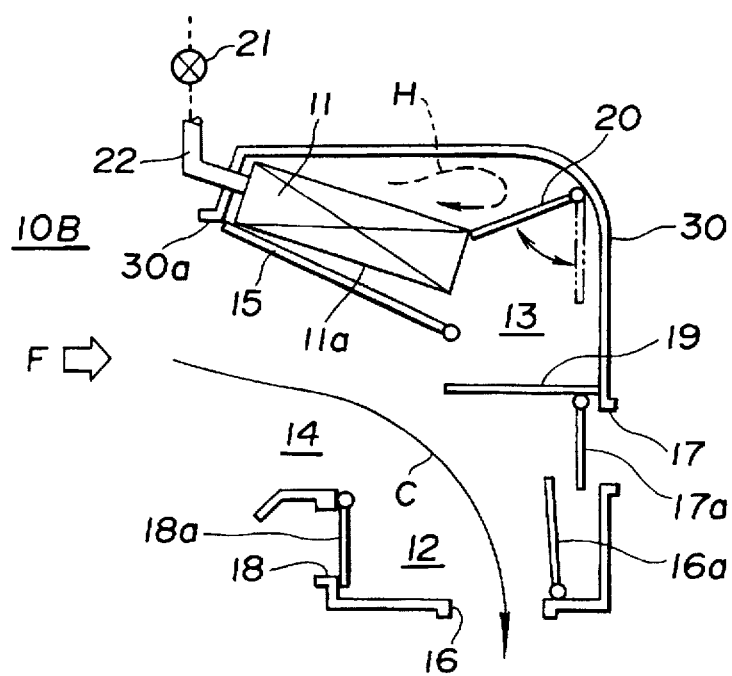
FIG. 5 is a view similar to FIG. 5, but showing another conventional heater unit.

A temperature compensating lib 19 is arranged in the case 30 in the same manner as in the above-mentioned conventional heater unit 10A of FIG. 4. That is, the lib 19 projects from the case 30 near a downstream end of the hot air passage 13 into a portion where the downstream end of the hot air passage 13 is merged with the air mix chamber 12.

A shutter door 32 is provided in the hot air passage 13, whose pivot shaft 32a is placed near the root portion of the temperature compensating lib 19, as shown. The pivot shaft 32a of the shutter door 32 is placed at substantially the same level as the pivot shaft 31a of the air mix door 31, as shown. These two pivot shafts 32a and 31a extend in parallel with each other.

It is to be noted that the shutter door 32 is located in the largest area of the hot air passage 13, which is positioned behind the pivot shaft 31a of the air mix door 31. That is, in the illustrated embodiment wherein the inclined heater core 11 is placed at an upstream end of the hot air passage 13 and the hot air passage 13 is generally U-shaped, the hot air passage 13 has inevitably the largest area behind the air mix door 31. In the illustrated embodiment, the shutter door 32 is slightly curved, so that it can intimately mate with a curved inner surface 30b of the case 30 when assuming full open position.

Figure 3:
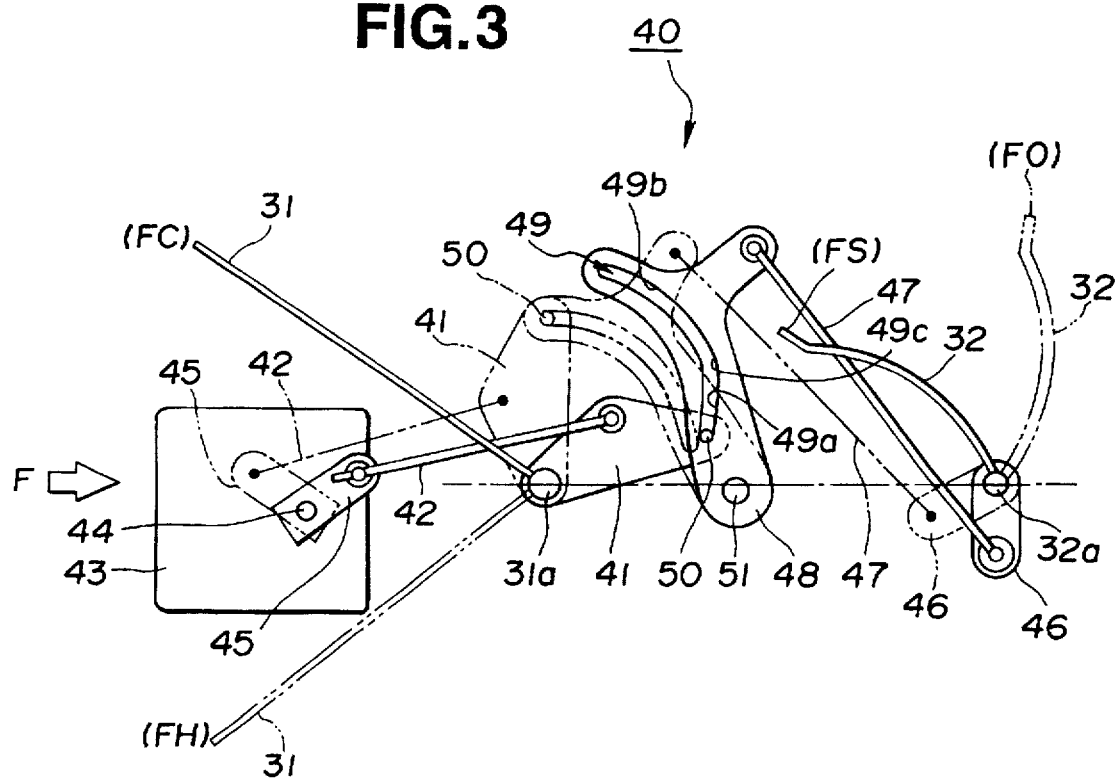
FIG. 3 is an illustration of a link mechanism employed for obtaining a synchronous movement between the air mix door and the shutter door.

The pivoting movement of the air mix door 31 and that of the shutter door 32 are synchronized by a link mechanism 40 of FIG. 3 which will be described in detail hereinafter.

Figure 2:
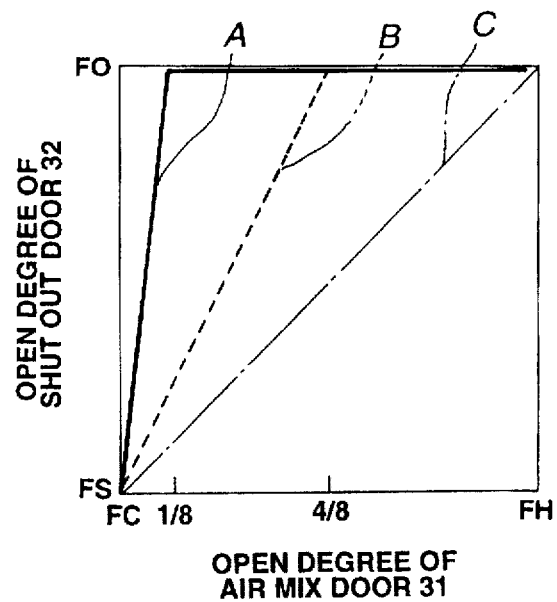
FIG. 2 is a graph showing a relationship between an open degree of an air mix door and that of a shutter door.

The synchronized movements of the doors 31 and 32 are depicted by the graph of FIG. 2. In the invention, the movements are carried out in accordance with the characteristic exhibited by the line "A". That is, when the air mix door 31 assumes the full cool position "FC" fully closing the front face 11a of the heater core 11, the shutter door 32 assumes a full close position "FS" as shown in FIG. 1A. Under this condition, the hot air passage 13 is completely blocked by the two doors 31 and 32. More specifically, the space of the hot air passage 13 downstream of the heater core 11 is blocked by the shutter door 32. While, when the air mix door 31 starts opening movement and comes to its "⅛" open position, the shutter door 32 comes to its full open position "FO" fully opening the hot air passage 13. That is, in this case, the space of the hot air passage 13 downstream of the heater core 11 is fully communicated with the air mix chamber 12. Of course, during the time when the air mix door 31 pivots from the "⅛" open position to the full hot position "FH", the shutter door 32 keeps the full open position "FO". Experiments have revealed that even if the synchronized movements of the two doors 31 and 32 are carried out in accordance with the characteristic of the line "B", a satisfied result is obtained. That is, in this case, when the air mix door 31 starts opening movement and comes to "⅜" open position, the shutter door 32 comes to the full open position "FO". The experiments have further revealed that a satisfied result is not obtained when the synchronized movements are carried out in accordance with the characteristic of the line Referring to FIG. 4, there is shown the link mechanism 40 by which the above-mentioned synchronized pivoting movements of the two doors 31 and 32 are carried out.

The link mechanism 40 comprises a first link 41 whose one end is fixed to the pivot shaft 31a of the air mix door 31. A first connecting rod 42 has one end pivotally connected to a middle portion of the first link 41 and the other end pivotally connected to a lever member 45 which is secured to an output shaft 44 of an actuator 43. Thus, upon energization of the actuator 43, the first link 41 is driven to pivot the air mix door 31.

A second link 46 is fixed at one end to the pivot shaft 32a of the shutter door 32. As shown in the drawing, the pivot shafts 32a and 31a of the two doors 32 and 31 are arranged at the same level. A second connecting rod 47 has one end pivotally connected to the other end of the second link 46 and the other end pivotally connected to a projected portion of an intermediate link 48 which pivots about a pivot shaft 51. The intermediate link 48 is formed at its major portion with a guide slot 49 with which an actuation pin 50 of the first link 41 is slidably engaged. The guide slot 49 includes an operative part 49a which can pivot the intermediate link 48 in response to pivoting of the first link 41, and an inoperative part 49b which can't pivot the intermediate link 48 even upon pivoting of the first link 41.

When, due to energization of the actuator 43, the lever member 45 pivots from a position shown by the phantom line to a position shown by the solid line, the first link 41 is pivoted clockwise in the drawing to a position shown by the solid line thereby pivoting the air mix door 31 to the full cool position "FC". During this, the actuation pin 50 of the first link 41 pushes the intermediate link 48 at the operative part 49a of the guide slot 49, thereby pivoting the intermediate link 48 to a position shown by the solid line. With this, the second link 46 to comes a position shown by the solid line thereby pivoting the shutter door 32 to the full close position "FS" shown by the solid line. That is, when the lever member 45 assumes the position shown by the solid line, the two doors 31 and 32 assume their full close positions as shown by FIG. 1A and the actuation pin 50 is placed at the lowermost end of the guide slot 49 as shown in FIG. 3. As shown in FIG. 1A, in this condition, the top of the shutter door 32 is mated with the ridge portion 55a of the holding wall 55.

While, when the lever member 45 pivots backward toward the position shown by the phantom line, the first link 41 is pivoted counterclockwise thereby pivoting the air mix door 31 toward the full hot position "FH" shown by the phantom line. During this, the actuation pin 50 of the first link 41 slides upward in the operative part 49a of the slot 49 inducing a counterclockwise pivoting of the intermediate link 48 about the pivot shaft 51. Due to the counterclockwise pivoting of the intermediate link 48, the second connecting rod 47 pulls the second link 46 thereby pivoting the shutter door 32 toward the full open position "FO" shown by the phantom line. When the backward pivoting of the lever member 45 is so advanced that the actuation pin 50 reaches to a boundary point 49c between the operative and inoperative parts 49a and 49b of the guide slot 49, the air mix door 31 comes to the "⅛" open position and the shutter door 32 comes to the full open position "FO". In this condition, the intermediate link 48 assumes the leftmost position as shown by the phantom line. When the lever member 45 is further pivoted backward causing the actuation pin 50 to run along the inoperative part of the guide slot 49, the air mix door 31 is further pivoted counterclockwise toward the full hot position "FH". However, during this, the intermediate link 48 is kept unmoved because movement of the actuation pin 50 in the inoperative part 49b of the guide slot 49 produces no force for moving the intermediate link 48, and thus, the shutter door 32 keeps the full open position "FO". When the lever member 45 comes back to the position shown by the phantom line, the first link 41 comes to the leftmost position shown by the phantom line and thus the air mix door 31 reaches to the full hot position "FH". That is, when the lever member 45 assumes the position shown by the phantom line, the two doors 31 assume the positions as shown by FIG. 1B and the actuation pin 50 is placed at the uppermost end of the guide slot 49.

In a full cool mode of the air conditioning device, the heater unit 100 assumes the condition as shown by FIG. 1A. That is, the air mix door 31 is in the full cool position "FC", the shutter door 32 is in the full close position and the second opening 16 for ventilation of passenger room is opened.

While, in a full hot mode of the air conditioning device, the heater unit 100 assumes the condition as shown by FIG. 1B. That is, the air mix door 31 is in the full hot position "FH", the shutter door 32 is in the full open position and the second opening 17 for the hoot warming is opened.

In the following, advantages of the present invention will be described.

In the full cool mode, the hot air passage 13 downstream of the heater core 11 is completely closed or blocked by the shutter door 32. In fact, in such mode, the top end of the shutter door 32 contacts the ridge portion 55a of the wall 55 to achieve a sealing therebetween. Thus, undesired mixing of hot air "H" in the hot air passage 13 with cooled air "C" flowing from the cool air passage 14 is effectively blocked even when the flow of the cooled air "C" produces the induction effect.

Due to provision of the wall 55, air staying in the downstream part of the hot air passage 13 is prevented from directly contacting the water tank 11b of the heater core 11, and thus the air in that part is hardly warmed. This promotes the full cool operation of the air conditioning device.

Because the shutter door 32 is placed in the largest area of the hot air passage 13 which is inevitably provided behind the pivot shaft 31a of the air mix door 31, there is no need of specially enlarging the space where the shutter door 32 is arranged. Thus, the linearly variable relationship between the temperature of air led into the passenger room and the pivoting movement of the air mix door 31 is obtained without increasing the size of the heater unit 100.

As is seen from FIG. 1A, when the air mix door 31 assumes the full cool position "FC", there is defined a certain triangular space "T" which is enclosed by the air mix door 31, the front face 11a of the heater core 11 and the flange portion 55b of the wall 55. The space "T" serves as heat insulating means, and heating of the air mix door 31 by the radiation heat from the heater core 11 is suppressed or at least minimized. This is quite advantageous in the full cool mode because the air mix door 31 is largely exposed to the cooled air "C".

Since the shutter door 32 is curved to intimately mate with the curved inner surface 30b of the case 30, it has no bad effect on smoothed flow of hot air in the hot air passage 13 when assuming the full open position.

As is described hereinabove, when assuming the full cool condition, the heater unit 100 of the invention can provide an arrangement by which not only mixing of warmed air in the hot air passage 13 with the cooled air "C" flowing in the cool air passage 12 but also heat translation from the heater core 11 to the cooled air "C" is effectively suppressed.

What is claimed is:

1. A heater unit of automotive air conditioning device, comprising:

a case having an air inlet opening and a plurality of air outlet openings;

means for defining in said case a cool air passage, a hot air passage and an air mix chamber, said cool air passage having an upstream end merged with said air inlet opening and a downstream end merged with said air mix chamber, said hot air passage having an upstream end merged with the upstream end of said cool air passage and a downstream largest area merged with said air mix chamber, said air mix chamber being directly communicated with said air outlet openings;

a heater core arranged in the upstream end of said hot air passage, said heater core being inclined with respect to a flowing direction of air which is directed toward said air inlet opening from the outside of said case;

an air mix door pivotally arranged in said case to vary the flow rate between the amount of air directed toward the hot air passage and the amount of air directed toward the cool air passage, said air mix door having a full cool position wherein said air mix door fully closes a front face of said heater core while fully opening the cool air passage and a full hot position wherein said air mix door fully opens the front face of said heater core while fully closing said cool air passage;

a shutter door pivotally arranged in said downstream largest area of said hot air passage, said shutter door being capable of fully closing the hot air passage and fully opening the same; and a link mechanism for achieving synchronized pivoting movements of said air mix door and said shutter door, said link mechanism inducing at least first and second conditions, said first condition being a condition wherein said air mix door assumes said full cool position and said shutter door fully closes said hot air passage, said second condition being a condition wherein said air mix door assumes a given position other than said full cool and full hot positions and said shutter door fully opens said hot air passage.

2. A heater unit as claimed in claim 1, in which said given position of the air mix door is the position wherein the ratio between an air inlet open area defined by the air mix door for the hot air passage and that defined by the air mix door for the cool air passage is approximately 1/8.

3. A heater unit as claimed in claim 2, in which said link mechanism is so arranged that while said air mix door is pivoted from said full cool position to said given position, said shutter door is pivoted from the full close position to the full open position.

4. A heater unit as claimed in claim 3, in which said link mechanism is so arranged that while said air mix door is pivoted from said given position to said full hot position, said shutter door is kept in the full open position.

5. A heater unit as claimed in claim 1, in which said hot air passage is generally U-shaped so as to partially surround a water tank of said heater core.

6. A heater unit as claimed in claim 5, in which the largest area of said hot air passage is located just behind a pivot shaft of said air mix door.

7. A heater unit as claimed in claim 1, in which said shutter door is so shaped and curved as to intimately mate with a curved inner surface of the hot air passage of the case when assuming the full open position.

8. A heater unit as claimed in claim 1, further comprising a wall integrally provided in said case for shielding the hot air passage from a water tank of said heater core.

9. A heater unit as claimed in claim 8, in which said wall has a recess for receiving the water tank therein.

10. A heater unit as claimed in claim 9, in which said wall is formed with both a ridge portion against which a top end of said shutter door abuts when said shutter door assumes the full close position and a flange portion which projects into the cool air passage.

11. A heater unit as claimed in claim 9, in which a triangular space is defined by said flange portion, said air mix door and said front face of said heater core when said air mix door assumes the full cool position.

12. A heater core as claimed in claim 1, in which respective pivot shafts of said air mix door and said shutter door are arranged at the same level and extend in parallel with each other.

13. A heater core as claimed in claim 1, in which said link mechanism comprises:

an actuator;

a first link secured to a pivot shaft of said air mix door;

first means for pivoting said first link when said actuator is energized;

a second link secured to a pivot shaft of said shutter door;

an intermediate link pivotal about an intermediate pivot shaft;

second means for pivoting said second link when said intermediate link pivots about the intermediate pivot shaft;

a guide pin provided on said first link;

means for defining in said intermediate link a curved guide slot with which said guide pin is slidably engaged.

14. A heater unit as claimed in claim 13, in which said curved slot includes an operative part which induces a pivoting movement of said intermediate link upon pivoting of said first link and an inoperative part which fails to induce the pivoting movement of said intermediate link even upon pivoting of said first link.

15. A heater unit as claimed in claim 14, in which said first means comprises:

a lever member secured to the output shaft of said actuator; and a first connecting rod having one end pivotally connected to said lever member and the other end pivotally connected to said first link.

16. A heater unit as claimed in claim 15, in which said second means comprises:

a projection formed on said intermediate link; and a second connecting rod having one end pivotally connected to said projection and the other end pivotally connected to said second link.

* * * * *